United States Patent Office 3,759,813
Patented Sept. 18, 1973

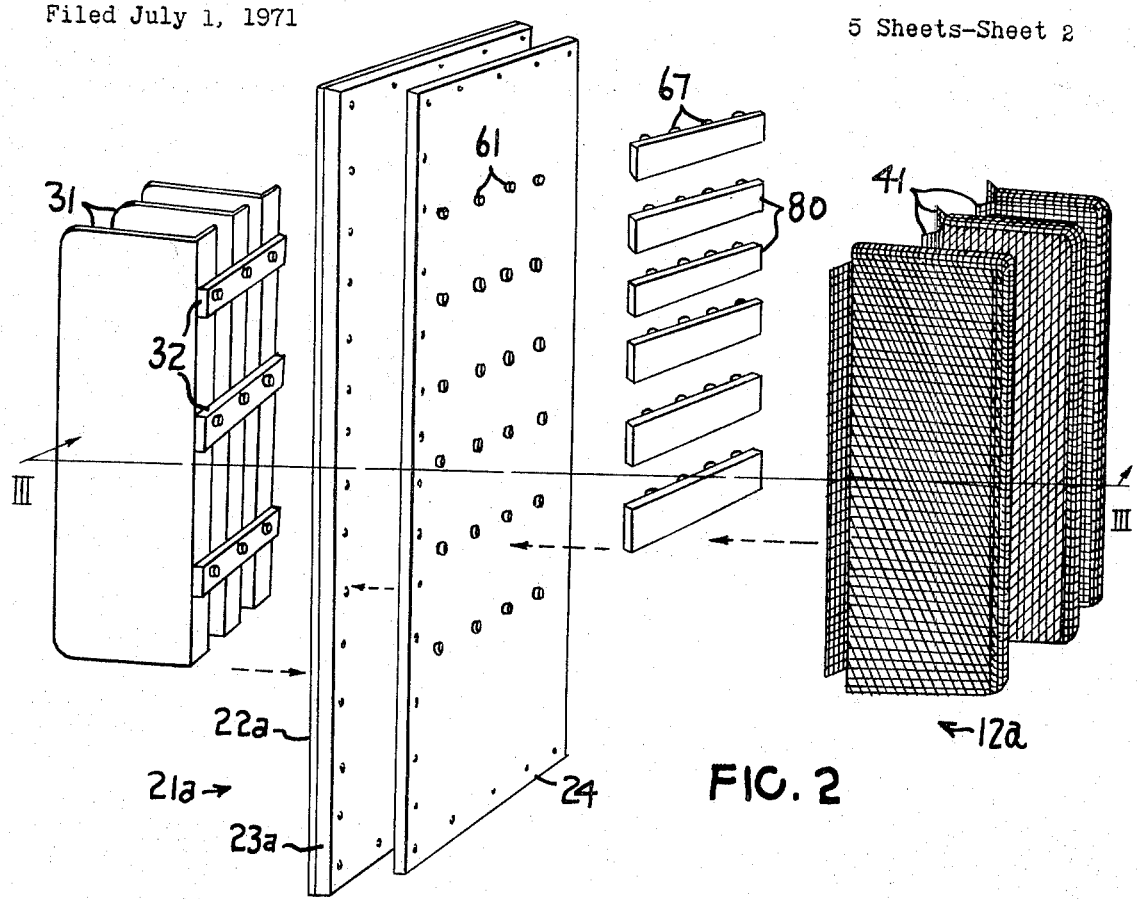
FIG. 2
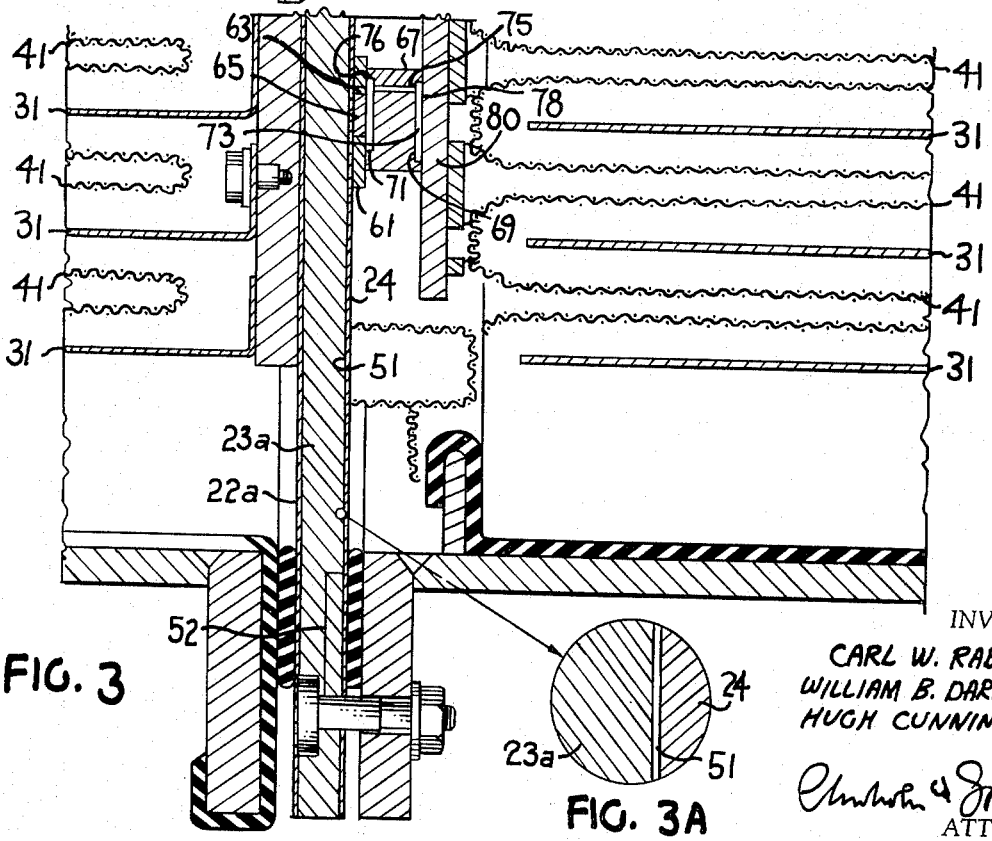
FIG. 3
FIG. 3A

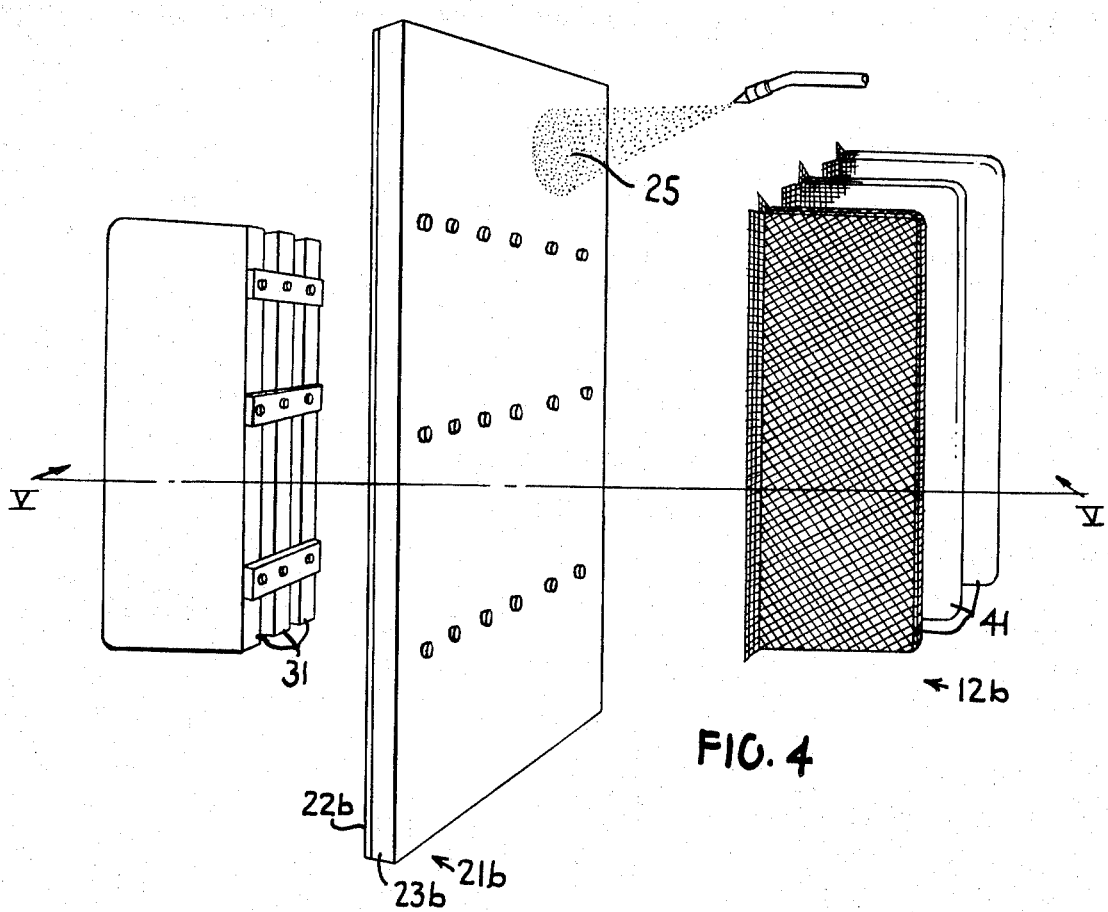
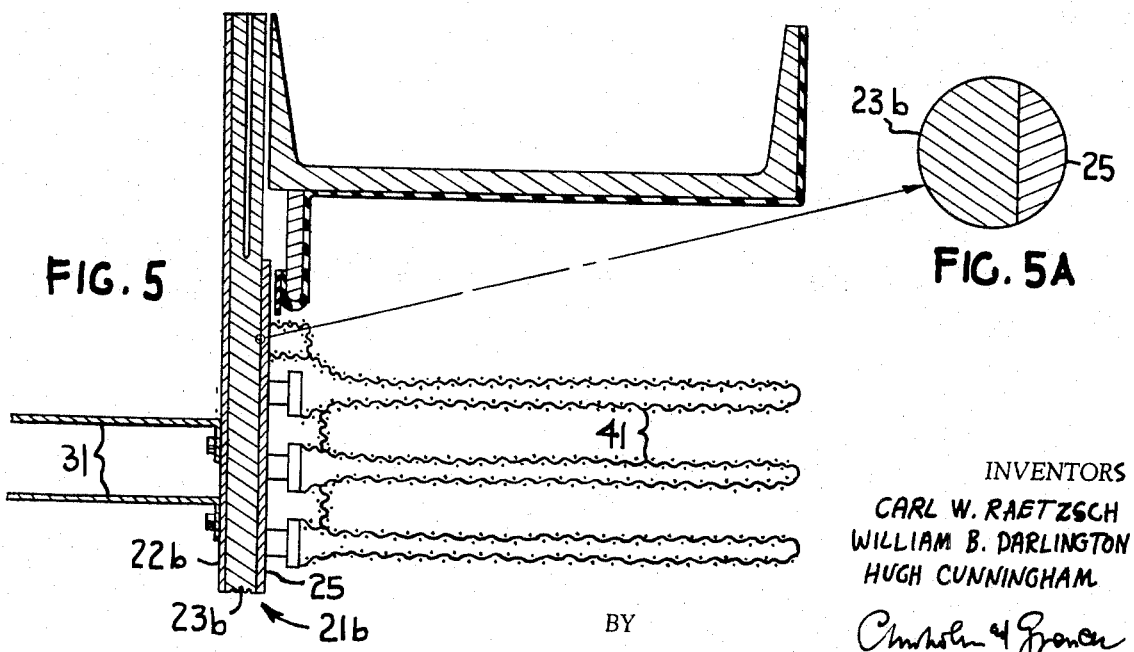

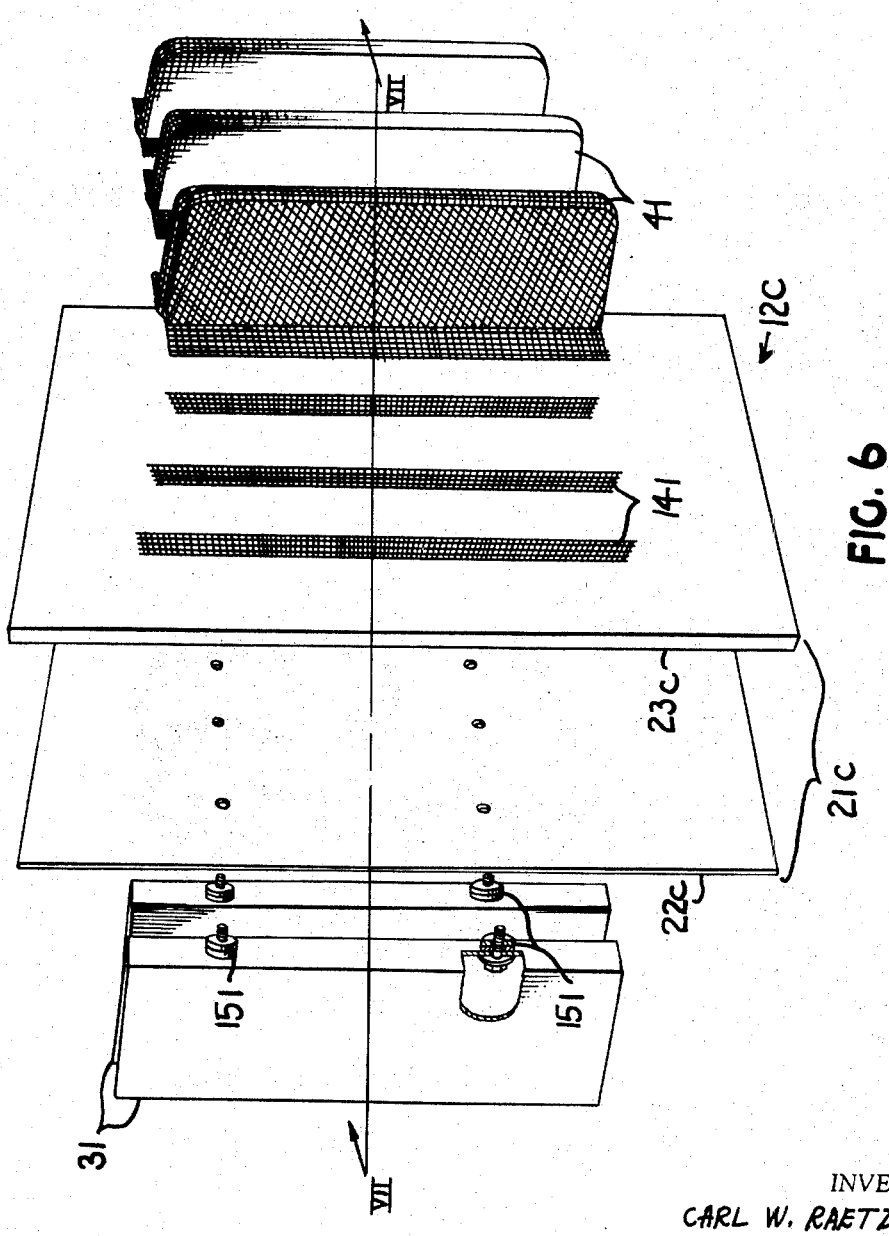

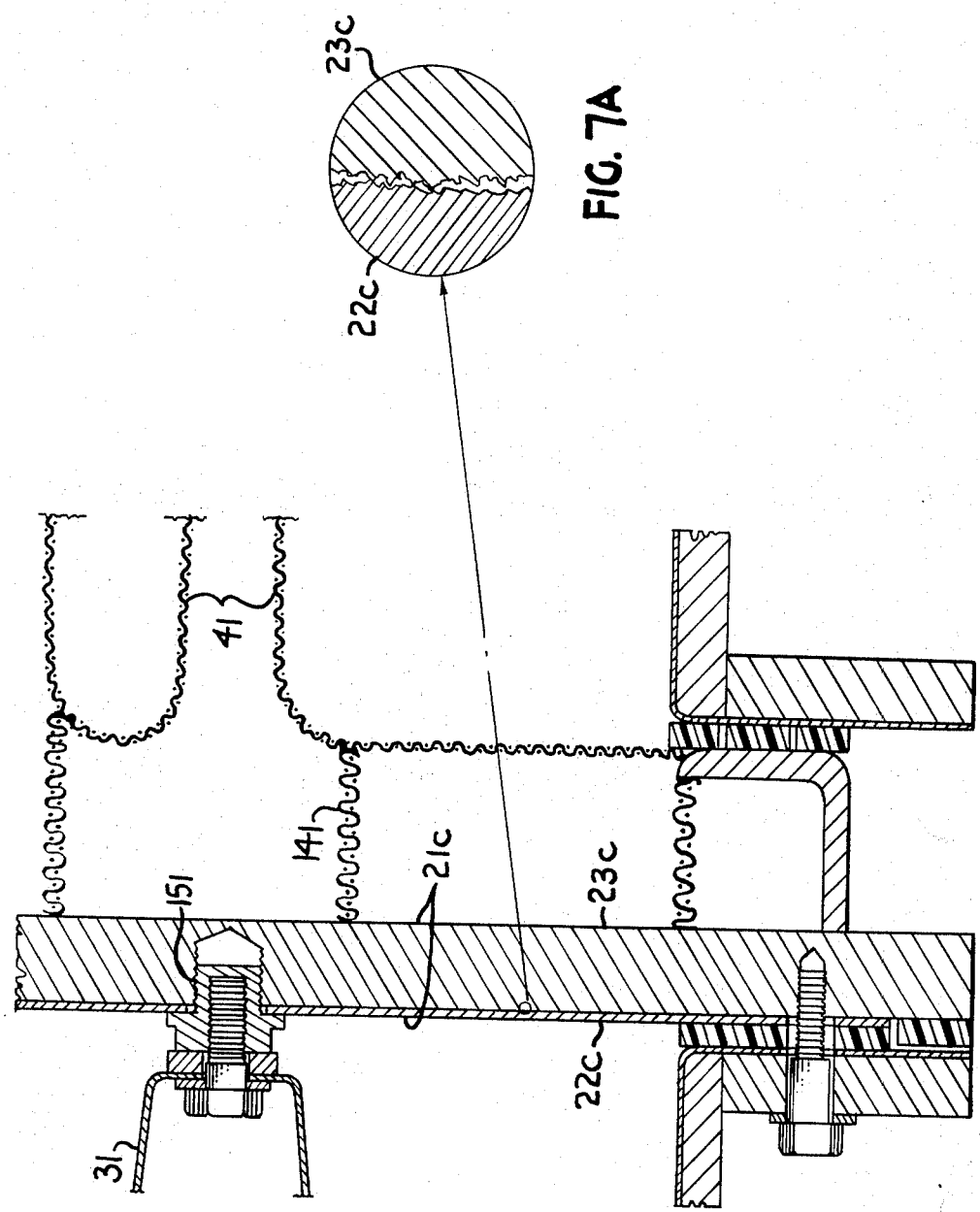

3,759,813
ELECTROLYTIC CELL
Carl W. Raetzsch, William B. Darlington, and Hugh Cunningham, Corpus Christi, Tex., assignors to PPG Industries, Inc., Pittsburgh, Pa.
Continuation-in-part of application Ser. No. 55,680, July 17, 1970, now abandoned. This application July 1, 1971, Ser. No. 158,695
Int. Cl. B01k 3/06; C01b 11/26
U.S. Cl. 204—256
14 Claims

ABSTRACT OF THE DISCLOSURE

A novel bipolar unit for use in bipolar diaphragm cell electrolyzers is disclosed. Both members of the backplate of the bipolar unit—the anodic surface and the cathodic surface—are metallic. The backplate is particularly resistant to hydrogen-induced structural failure.

CROSS-REFERENCE TO RELATED APPLICATION

This is a continuation-in-part of our copending U.S. application Ser. No. 55,680, filed July 17, 1970, now abandoned.

BACKGROUND OF THE INVENTION

Aqueous solutions of alkali metal halides, as sodium chloride and potassium chloride, are electrolyzed to yield the alkali metal hydroxide, the halogen, and hydrogen. This electrolysis is generally carried out in one of two types of cells, the mercury cell and the diaphragm cell.

In the diaphragm cell there are two electrolyte compartments. One is the cathode electrolyte compartment or catholyte compartment. The other compartment is the anode electrolyte compartment or anolyte compartment. These two compartments are separated by a semi-permeable diaphragm, typically of asbestos. Diaphragm cells may be electrically connected in series in a common housing, with the anodes of one diaphragm cell being in series electrically with the cathodes of the prior cell in the circuit and mounted on the opposite side of a common structural member (e.g., a backplate) therewith, and the cathodes of the cell being in series with the anodes of the next adjacent cell in the circuit, and mounted on common structural member. Such a configuration is called a bipolar configuration. An assembly of diaphragm cells in bipolar configuration, the anodes of one cell being electrically in series with and physically connected to the cathodes of the next adjacent cell by means of a common structural member within the electrolyzer, is called an "electrolyzer."

The common member, having a backplate with both the anodes of one cell and the cathodes of the next adjacent cell in the series connected thereto, is called a "bipolar unit."

The assembly provided by the anodes of one bipolar unit interleaved with the cathodes of the adjacent bipolar unit and facing each other so that electrolysis of alkali metal chloride solutions surrounding these anodes and cathodes may be carried out therebetween, is called a "bipolar cell."

Bipolar electrolyzers are described in Mantell, Electrochemical Engineering (4th Ed.), McGraw-Hill Book Co., Inc., New York, N.Y. (1960), and in Kircher, "Electrolysis of Brines in Diaphragm Cells" in Sconce, Chlorine, Reinhold Publishing Corp., New York, N.Y. (1962). Bipolar electrolyzers of the prior art are shown in U.S. Patent 1,907,818 to R. M. Hunter, U.S. Patent 2,161,166 to R. M. Hunter, U.S. Patent 2,282,058 to R. M. Hunter, U.S. Patent 2,858,263 to J. L. Lucas et al., and U.S. Patent 3,337,443 to Raetzsch et al.

SUMMARY OF INVENTION

In order to take advantage of the apparent economies of bipolar electrolyzers, electrolysis should be conducted at high anode current densities and brine feed rates. When electrolysis is carried out at high anode current densities, for example, above about 100 amperes per square foot, it is important that the electrical current flow efficiently through the backplate. This becomes more important when the backplate is a sandwich of two metals, as titanium and steel.

One way of insuring that the flow of electricity through the backplate is efficient (i.e., that the voltage drop across the backplate is low or negligible) is to provide within the sandwich of titanium and steel of the backplate tight, metal-to-metal contact between the titanium and the steel, for example as at an interface. Another may is to rely upon other electrically conductive structures in the backplate to carry the current from the cathodes or cathodic plate, through the backplate, to the anodes connected thereto, e.g., to provide copper studs which extend through the backplate for conducting current.

It has been discovered in operating bipolar electrolyzers with backplates having steel and titanium members, such as described above, that atomic hydrogen generated on the steel cathodic surface of the backplate migrates through the steel toward the titanium member of the backplate. This hydrogen is generated by the electrical current that passes from the anode through the electrolyte in a straight line path directly to the steel cathodic surface of the backplate, thereby causing electrolysis on the steel cathodic surface.

In electrolytic cells having a titanium-steel bond, the passage of the hydrogen so generated, through the steel member toward the titanium member, is deleterious to the structural integrity of the backplate. In due course this migration of hydrogen atoms is apt seriously to weaken the strength of the steel-titanium backplate, and can be expected to weaken the steel-titanium bond, possibly leading to the flaking off of the titanium and the misalignment of the anodes. Additionally, when the steel cathodic member of the backplate has been fabricated from steel that has been subjected to considerable amount of cold working, the hydrogen may cause blistering of the steel. In electrolytic cells having current conducting means from the cathodes, through the backplate, to the anodes, the formation of the hydride may lead to misalignment of the anodes. In accordance with this invention, migration of atomic hydrogen through the steel into contact with the titanium within the backplate is prevented or substantially minimized. This is accomplished by suppressing the formation of atomic hydrogen on the cathodic side of the backplate by reducing the hydrogen atom migration from the backplate through the steel member of the backplate to the titanium mmeber and by protecting the titanium member from contact by atomic hydrogen.

Any of a variety of specific expedients may serve to accomplish this. For example, the migration of hydrogen atoms through the steel member of the backplate may be reduced by interposing between the catholyte and the steel member of the backplate a coating providing a barrier to the migration of hydrogen atoms so that the atomic hydrogen is prevented from entering the steel member of the backplate. In addition to or in lieu of the hydrogen barrier coating, steps may be taken to provide for the combination of the atomic hydrogen to molecular hydrogen before the atomic hydrogen reaches the titanium member of the backplate. And further, in addition to or in lieu of either of the expedients described above, a coating may be provided on the backplate having a hydrogen overvoltage higher than the hydrogen overvoltage of the cathodes so that the generation of atomic hydrogen on the backplate is substantially reduced.

DESCRIPTION OF THE INVENTION

Specific exemplifications of the invention disclosed herein may be further understood by reference to the figures:

FIG. 2 is an exploded perspective view of a bipolar unit of one embodiment of the invention.

FIG. 3 is a cut-away drawing along plane III—III of the bipolar unit of FIG. 2.

FIG. 3A is an enlarged view of a portion of FIG. 3.

FIG. 4 is an exploded perspective view of another embodiment of this invention.

FIG. 5 is a cut-away drawing along plane V—V of the bipolar unit of FIG. 4.

FIG. 5A is an enlarged view of a portion of FIG. 5.

FIG. 6 is an exploded perspective view of a bipolar unit of another embodiment of this invention.

FIG. 7 is a cut-away drawing along plane VII—VII of the bipolar unit of FIG. 6.

FIG. 7A is an enlarged portion of FIG. 7.

Figure 1:
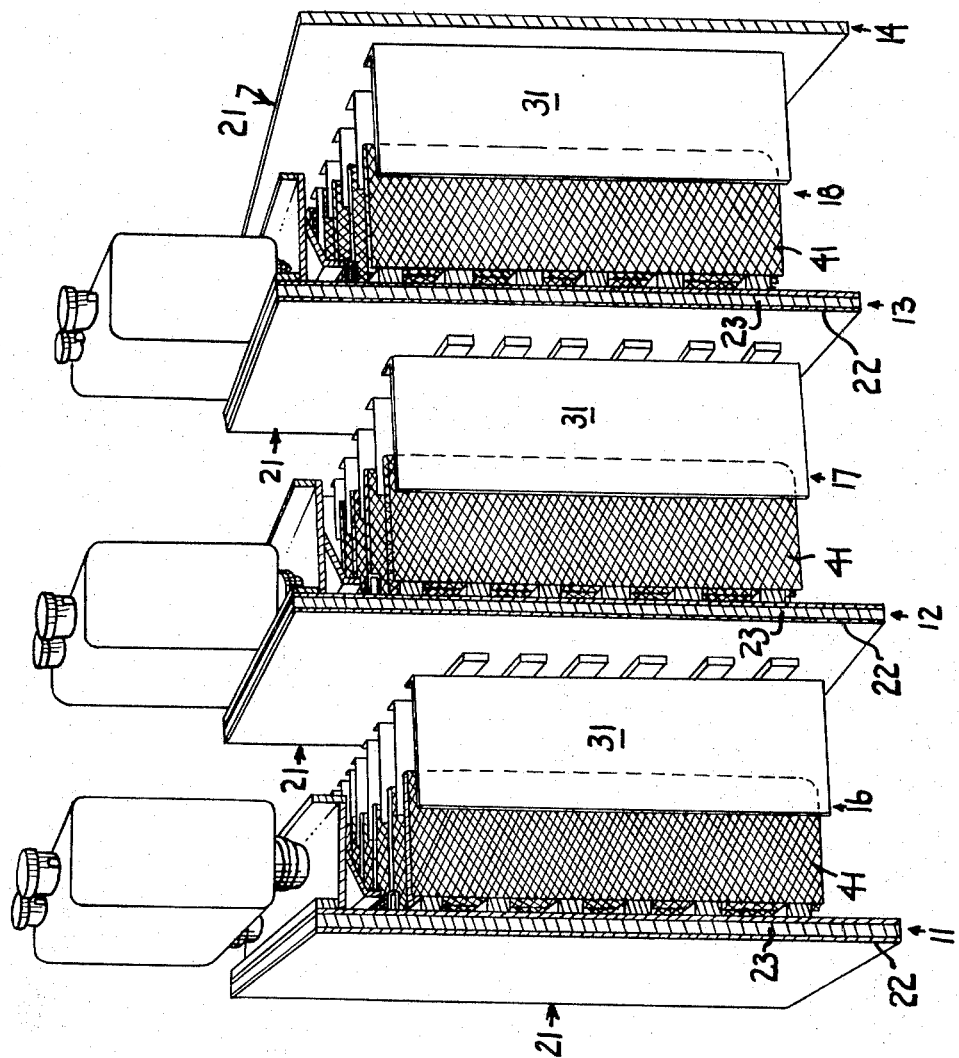
FIG. 1 is an exploded partial cut-away perspective of a bipolar electrolyzer.

An arrangement of bipolar units forming an electrical series of bipolar cells in an electrolyzer is shown in FIG. 1. Bipolar units 11, 12, 13, and 14 form bipolar cells 16, 17, and 18. End unit 11 provides a cathodic half cell, while end unit 14 provides an anodic half cell. The intermediate bipolar units 12 and 13 are bipolar units providing both anodic and cathodic half cells.

In addition to having end half units 11 and 14, an electrolyzer will normally include at least one bipolar unit 12 and may be comprised of a plurality (up to 10 or 15, or even more) of bipolar units 12 and 13. Thus, while only two intermediate units are shown in FIG. 1, bipolar diaphragm electrolyzers with any number of bipolar units are included within the contemplation of this invention, the number of such units being limited only by economic considerations.

An individual bipolar unit 12 in an electrolyzer comprises a backplate 21 having an anodic surface 22 and a cathodic surface 23, with substantially vertical planar anodes 31 attached substantially perpendicular to the anodic surface 22 and substantially vertical planar cathodes 41 attached substantially perpendicular to the cathodic surface 23. During electrolysis, current passes from the cathodes 41 through the backplate 21 to the anodes 31 of the next cell in the electrolyzer.

The backplate 21 of a bipolar unit 12 comprises a steel plate 23 facing the catholyte, and a titanium plate 22 facing the anolyte. While steel and titanium are referred to as the two components of the backplate, it should be understood that this invention is applicable with backplates of other metals. For the anodic surface, other valve metals in addition to titanium can be used. Valve metals are those metals forming a protective oxide coating conductive only in the cathodic direction, such as titanium, tantalum, or tungsten. Whenever titanium is referred to herein, it will be understood that other valve metals are also intended. For the cathodic surface, iron and alloys of iron with chromium, molybdenum, manganese, cobalt, vanadium, zirconium, hafnium, nickel, silicon, or carbon can also be used. When used in the claims it will be understood that term "steel" includes iron and iron alloys.

The steel-titanium sandwich may be formed by welding, by bolting the two sheets together, or by various soldering techniques. Alternatively, the two sheets may be explosively bonded as disclosed in U.S. Pat. 3,137,937 to Cowan et al. Alternatively, the steel and titanium members may be mechanically joined together, as by bolts, rivets, studs, or the like.

An individual bipolar cell, as cell 17 in FIG. 1, comprises the anodes 31 and backplate of one bipolar unit 13 and the cathodes 41, and backplate 21 of the next adjacent bipolar unit 12 in the electrolyzer. The anodes 31 of the one unit 13 and the cathodes 41 of the next adjacent unit 12 in the electrolyzer are interleaved within cell 17, with the anodes 31 positioned between and parallel to the cathodes 41. Best results are obtained if the anode 31 is equidistant from the two cathodes 41 on either side of it.

In the process of electrolysis, electrical current flows from the backplate 21 of bipolar unit 13 through the anodes 31 attached thereto. Most of the current travels from anode 31 through the electrolyte and diaphragm to the cathode 41 attached to the backplate 21 of the next bipolar unit 12 in the electrolyzer. This current flow is substantially perpendicular to the electrodes 31 and 41. The current then flows through cathode 41 to the backplate 21 of the next unit 12.

Some of the current, typically from about 2 percent to about 20 percent of the current flowing through the cell, however, flows from the anode; more specifically, from the part of the anode nearest the cathodic surface of the backplate, through the electrolyte to the backplate. This current causes electrolysis at the cathodic face of the backplate and gives rise to an electrolytic current density of about 2 to 20 amperes per square foot on the backplate. The hydrogen that is so liberated on the cathodic face of the backplate is believed to be the principal source of hydrogen that migrates through the steel member of the backplate toward the titanium member in electrolyzers of the type shown in FIG. 1.

Migration of the atomic hydrogen through the steel member 23 of the backplate 21 to the titanium member 22 of the backplate 21 results in the formation of titanium hydride wherever the hydrogen contacts the titanium. This initially occurs on the surface of the titanium member 22 facing the steel member 23. The formation of the titanium hydride on the titanium member causes misalignment of the anodes. In those electrolyzers wherein the titanium member of the backplate is bonded to the steel member thereof, such hydride formation may cause the flaking off of the titanium member 22 of the backplate 21 and may eventually cause the anodes 31 to fall off of the backplate 21. This apparently is attributable to the fact that titanium hydride is less dense then titanium and, hence, its formation results in expansion. Moreover, atomic hydrogen diffuses through the hydride so that formation of the initial hydride does not provide a barrier to further hydride formation.

According to this invention, the formation of hydride caused by the migration of atomic hydrogen through the steel member 23 of the backplate 21 toward the titanium member is minimized or substantially prevented. As used herein "atomic hydrogen" means that form of hydrogen which passes through ferrous metals, e.g., steel. It includes that form of hydrogen which is generated during brine electrolysis on a cathodic surface.

One means of practicing this invention is shown in FIGS. 2 and 3. In this embodiment the passage of atomic hydrogen (which would otherwise be generated at the cathode surface of the steel plate and would pass through the steel plate 23a of the backplate 21a) is reduced by providing steel plate 23a with a protective sheet 24, and providing a space 51 between the sheet 24 and the steel plate 23a.

When space 51 contains electrolyte, no atomic hydrogen should be generated at the surface of plate 23a. Plug weld 65, having a lower resistance than the electrolyte in space 51, provides the main path of current flow between the cathodes 41 and the backplate 21a. Therefore, the flow of current through the electrolyte in space 51 is minimal and, accordingly, the electrolytic hydrogen generated within space 51 is insignificant. When space 51 is electrolyte free, there is no hydrogen-containing compound within space 51 and, accordingly, no electrolytic generation of hydrogen within space 51.

Structural details of the exemplification making use of a protective metal sheet 24 and a space 51 between the metal 24 and the steel plate 23a are shown in FIGS. 2, 3, and 3A. In FIG. 2 there is shown an exploded view of a bipolar unit 12a of FIG. 1 having a backplate 21a, and in FIG. 3 there is shown a cut-away unexploded view of bipolar unit 12a along plane III—III of FIG. 2. FIG. 3A is an enlarged view of a section of FIG. 3. Here, backplate 21a partitions bipolar cells 16 and 17 (as shown in FIG. 1) and is the electrical conductor between the anodes 31 of bipolar cell 16 and the cathodes 41 of bipoar cell 17.

Backplate 21a of bipolar unit 12a comprises a sandwich of titanium sheet 22a on the anodic side of the unit 12a and a steel plate 23a on the cathodic side of the unit 12a. The titanium sheet 22a and the steel plate 23a are joined together to form the backplate 21a as described previously. Space 51 is sufficient to provide for the combination of any hydrogen atoms which may penetrate the protective sheet 24 to form hydrogen molecules. Typically, this space should separate the interior surface of the protective sheet 24 from the opposed surface of the steel plate 23a by at least 5 angstroms.

A vent or plurality of vents 52 are provided in the steel plate 23a. Vents 52 allow the molecular hydrogen formed in space 51 to escape and avoid any build-up of gas pressure in space 51.

Protective sheet 24 may be fabricated from any material which will not corrode in the service. This sheet 24 may be of steel. By using a metal having an atomic hydrogen solubility less than the atomic hydrogen solubility of the metal used in fabricating the steel plate 23a, the amount of hydrogen diffusing through the protective sheet 24 to space 51 is further reduced; hence the exposure of the steel plate 23a to atomic hydrogen is further reduced.

According to one preferred embodiment the protective sheet 24 has a lower atomic hydrogen solubility or diffusivity than does the steel backplate sheet 23a, for example, when protective sheet 24 is of copper. It is, nevertheless, recommended practice to space copper sheet 24 at least 5 angstroms and up to about 1 inch from steel plate 23a. In this way a space 51 is provided in which even the lesser amounts of atomic hydrogen which diffuse through copper sheet 24 can combine to molecular hydrogen before reaching the surface of the steel plate 23a.

The copper sheet 24 is typically from about 1/32 inch to about 1/4 inch thick. In order to prevent the formation of interstitial water within the copper sheet 24 during electrolysis, the copper used in the fabrication of the copper sheet 24 should have a low oxygen content. Best results are obtained if the copper sheet 24 is fabricated from oxygen-free, high-conductivity copper such as sold under the trademark "OFHC."

FIGS. 2 and 3 illustrate an exemplary configuration utilizing copper sheet 24 to protect backplate 21a. On the cathodic surface of plate 24 are studs 61 (preferably of copper) shown in greater detail in FIG. 3. These studs 61 are plug welded to the steel plate 23a of the backplate 21a in vertical and horizontal array, as shown in FIG. 2. A copper plug 65 extends through stud 61 and sheet 24, plug welding the stud 61 and the sheet 24 to steel plate 23a. These studs 61 are circular and have vent holes 63. Vent hole 63 is displaced from the center axis of stud 61. The vent hole 63 is about 2 percent to 5 percent of the total volume of stud 61.

Welded to stud 61 in the assembled bipolar unit 12 is stud 67 (also preferably of copper). Stud 67 is a cylinder wherein surfaces 69 and 71 may be recessed (typically by about 5 angstroms and rarely more than 1/32 inch) from the leading edges 73 and the stud 67. While it is preferred in the welding of stud 61 to stud 67 to align vent hole 63 with vent hole 75, this is not essential as the hydrogen flowing from compartment 78 through vent hole 75 will flow into the compartment 76 defined by the recessed surface 71, and leading edge 73 of stud 67 and the surface of stud 61. From compartment 76 the hydrogen will flow through vent hole 63.

A plurality of steel bars 80 are joined to the studs 67 as shown in FIG. 2. Steel bar 80 has the studs 67 welded to one face thereof. Welded to the opposite face of the steel bar 80 are the cathodes 41.

In another embodiment of this invention shown in FIGS. 4 and 5, the diffusion of atomic hydrogen through the steel plate 23b of the backplate 21b is suppressed by providing the steel plate 23b with a surface 25 of a metal having a higher hydrogen overvoltage than do the cathodes, thereby making the backplate less cathodic. Only the slightest differences in overvoltages need exist; but as a practical design consideration it will be at least 0.2 volt and, preferably, 0.4 volt. Rarely will it be greater than 1.5 volts. In this way the electrolytic formation of hydrogen in proximity to the cathodic surface of the steel plate 23b of the backplate 21b is suppressed. This substantially reduces the concentration of atomic hydrogen on the steel surface, thereby reducing the atomic hydrogen diffusion through the steel plate 23b.

Coating thicknesses are widely variable. It is important, however, if best results are to be obtained, that the coating be as free as possible from pin holes and any other surface imperfections which may allow electrolyte to reach the backplate. Satisfactory results are obtained when the coating is above about 5 microinches thick. Such a thickness insures that the coating is substantially free from such surface imperfections.

Any of the methods known in the art for depositing thin metal coatings may be used. Entirely satisfactory results are obtained, for example, by thermal decomposition of a metallic resinate, by electroless plating, or by vacuum sputtering. However, electrodeposition should be avoided as atomic hydrogen may be formed thereby.

This exemplification providing a high overvoltage coating is shown in exploded view in FIG. 4, showing bipolar unit 12b, and in cut-away along plane V—V of FIG. 4 in FIG. 5. Backplate 21b serves as the partition between bipolar cells 16 and 17 and the electrical connection between the anodes 31 of bipolar cell 16 and the cathodes 41 of bipolar cell 17.

Backplate 21b of bipolar unit 12b comprises a titanium sheet 22b on the anodic side of the unit 12b and a steel plate 23b on the cathodic side of the unit 12b. The titanium sheet 22b and the steel plate 23b are joined together to form the backplate 21b as described previously.

The metal coating 25 on the surface of the steel plate 23b serves to raise the hydrogen overvoltage of the backplate, as described.

Typically, the cathodes are iron mesh and have a hydrogen overvoltage under electrolyzer conditions of about .4 to .5 volt. When iron mesh electrodes are used, suitable overvoltage characteristics are exhibited by silver, gold, copper, chromium, manganese, tantalum, cadmium, zirconium lead, and zinc. Best results are obtained when the surface is cadmium, lead, or zinc. Alternatively, a material that is not electrolytically active may be used as the surface coating, such as rubber, a plastic, or a ceramic.

The cathodes 41 may be attached to the backplate 21b as described in the previous embodiment above. Alternatively, they may be attached to the backplate as described in copending application U.S. Ser. No. 836,082, filed June 24, 1969, now abandoned.

In another embodiment of this invention the coating 25 on the cathodic surface of the steel plate 22b is a hydrogen barrier. That is, the coating has a low hydrogen permeability or solubility relative to the hydrogen permeability or solubility of steel used in fabricating the steel plate 23b of the backplate 21b. In this way, while atomic hydrogen may be liberated at the cathodic surface of the backplate, it does not migrate to the steel surface 22b of the backplate in any appreciable extent. Suitable hydrogen barriers may be nonconductive materials, such as silicates and glasses, organic resins, and paints. Alternatively, metals having hydrogen barrier properties may be used. Suitable results may be obtained with vanadium, chromium, manganese, cobalt, nickel, copper, zinc, niobium, molybdenum, silver, cadmium, rhodium, tantalum, tungsten, iridium, and gold. Best hydrogen barrier results are obtained when the hydrogen barrier coating is molybdenum, rhodium, iridium, silver, gold, manganese, zinc, cadmium, lead, copper, or tungsten.

Additionally, the coating 25 may have both hydrogen barrier and high overvoltage properties. Such coatings are provided by chromium, copper, silver, zinc, lead, cadmium, molybdenum, and manganese.

Additionally, the spaced protective sheet of the embodiment shown in FIGS. 2 and 3 may have the necessary structural durability, as well as suitable hydrogen barrier and hydrogen overvoltage properties. Suitable metals include coper, zinc, cadmium, lead, and molybdenum being preferred for reasons of cost, availability, and durability.

In the exemplification of this invention wherein the iron or steel member of the backplate and the valve metal or titanium member of the backplate are not bonded to each other, further suppression of hydride formation may be provided by providing means between the steel member 23c of the backplate 21c and the titanium member 22c of the backplate 21c for the combination of the monoatomic hydrogen atoms to form diatomic hydrogen molecules prior to the said monoatomic hydrogen atoms' contacting the titanium member 22c. Such means for generating diatomic hydrogen molecules may be combined with means for the removal of the diatomic hydrogen molecules so generated.

In FIGS. 6 and 7 there is shown a bipolar unit 12c for use in an electrolyzer having as its backplate 21c an iron or steel member 23c and a valve metal (typically titanium) member 22c. The bipolar unit has anodes 31 and cathodes 41 mechanically and electrically connected to the backplate 21c. The anodes 31 are connected to the anodic member 22c of the backplate 21c, which member may be fabricated of titanium or any other valve metal. The cathodes 41 are connected to the cathodic member 23c of the backplate, which may be iron, steel or any metal or alloy resistant to the catholyte. Such catholyte-resistant materials are referred to as "iron" although other catholyte-resistant materials may be used interchangeably therewith.

The cathodes 41 may be mechanically and electrically connected to the iron or steel member 23c of the backplate 21c by various methods. In the bipolar unit 12c shown in FIGS. 6 and 7, the cathode fingers 41 are welded to perforate conductors 141 that are, in turn, welded to the catholyte-resistant iron or steel member 23c of the backplate 21c. Alternatively, the cathode fingers 41 may be bolted to the backplate 21c or otherwise connected thereto.

In the exemplification wherein the titanium member 22c of the backplate 21c is not metallurgically bonded to the catholyte member 23c, the electrical connection may be directly from the anodes 31 to the catholyte member 23c of the backplate 21c. For example, in FIGS. 6 and 7, a first bolt 151 is bolted into the iron or steel member 23c of the backplate 21c at one end of the first bolt 151, and the anode 31 is, in turn, bolted to the first bolt 151 at the opposite end thereof by a second bolt 155. In this way direct mechanical and electrical connection is provided between the anode 31 and the iron or steel member 23c of the backplate 21c.

The titanium member 22c of the backplate 21c serves to protect the iron or steel member 23c from attack by the anolyte. In order to assure an electrolyte-tight seal, the first bolt 151 may be welded to the titanium member 22c of the backplate 21c as well as being bolted to the catholyte member 23c as described hereinabove. Additionally, the first bolt 151 serves to hold the titanium member 22c of the backplate 21c in compression against the catholyte member 23c, thereby preventing contact of the catholyte member 23c by the anolyte.

As shown in FIG. 7A, the space between the titanium member 22c and the catholyte member 23c of the backplate 21c, caused by irregularities on the surfaces of the two members and the absence of a metallurgical bond, is sufficient to allow the combination of monoatomic hydrogen atoms to diatomic hydrogen molecules. The space between the two members 22c and 23c may be vented to the atmosphere to allow the escape of the diatomic hydrogen molecules there generated. This venting may be accomplished by providing a direct path for the diatomic hydrogen molecules to escape therefrom, as by the absence of gasketing. Alternatively, a vacuum may be drawn between the two members 22c and 23c of the backplate, thereby causing the diatomic hydrogen to be drawn out.

Alternatively, the titanium 22c and iron or steel members 23c of the backplate 21c may extend beyond the gasketing. In this way the space between the two members 22c and 23c of the backplate 21c is vented directly to the atmosphere. In this way, means are provided between the two members 22c and 23c of the backplate for the combination of the monoatomic hydrogen atoms to form diatomic hydrogen molecules, and further means are provided for the removal of the diatomic hydrogen molecules from the space between the two members 22c and 23c of the backplate 21c. Such further suppression may be used in lieu of or in addition to those expedients already described with respect to hydrogen barriers and high hydrogen overvoltage coatings on the iron or steel member 23c of the backplate 21c and with respect to electrolyte-free volumes between the iron or steel member 23c of the backplate 21c and the catholyte.

It has further been found that the rate of diffusion of atomic hydrogen appears to be particularly sensitive to the crystallographic properties of the medium. For example, steels having an austenitic crystal structure offer considerably more resistance to atomic hydrogen diffusion than do mild steels. Accordingly, in any of the embodiments of the invention, austenitic stainless steel may be substituted for the mild steel.

Additionally, this invention may be applied to advantage in such bipolar diaphragm electrolyzers of the prior art as have a steel backplate with a protective rubber coating over the anodic surface thereof. In such electrolyzers the atomic hydrogen permeability in the steel providing the backplate may be appreciably higher than the atomic hydrogen permeability in the rubber coating, in which case hydrogen diffusing through the steel backplate may build up between the steel backplate and the rubber coating. This may ultimately cause the rubber coating to be ruptured and displaced, therefore allowing anolyte to breach the rubber coating and attack the steel backplate. The build-up of such hydrogen is substantially reduced by the teachings of this invention.

Further suppression of atomic hydrogen generation may be provided by increasing the space between the anodes and the cathodic backplate. In this way the IR drop from the anodes to the backplate is increased, thereby reducing the current flow from the anodes directly to the backplate.

Additionally, the flow of current directly from the anodes to the cathodic backplate may be reduced by rendering that part of the anode blade nearest the cathodic backplate nonconductive. This may be done by providing a nonconductive layer at the edge of the anode plate or by crimping the edge of the anode blade.

Where the use of a cathode bar, having the cathode fingers welded thereto, has been called for, it is to be understood that suitable results may also be obtained with studs connected to the backplate and having the cathode fingers welded thereto.

Although this invention and its embodiments have been described above with reference to certain specific examples and illustrative embodiments, it is not intended that it

What is claimed is:

1. An electrolyzer comprising a plurality of bipolar cells in series having bipolar units, at least one of said bipolar units comprising:
   a backplate providing a barrier between adjacent cells in the series;
   a cathode extending from one surface of said backplate and in electrical contact therewith; and
   an anode extending from the opposite surface of said backplate and in electrical contact therewith;
   said backplate comprising:
   a catholyte-resistant member having two surfaces;
   a valve metal member touching the surface opposite the surface of the catholyte-resistant member from which the cathode extends and;
   means for forming molecular hydrogen from atomic hydrogen between the catholyte-resistant member and the valve metal member.

2. The electrolyzer of claim 1 wherein the means between the catholyte-resistant member of the backplate and the valve metal member of the backplate for forming molecular hydrogen comprises sufficient void spaces between the said catholyte-resistant member and valve metal member to permit the recombination of molecular hydrogen and the release of the hydrogen so formed to the atmosphere.

3. The electrolyzer of claim 2 wherein the void spaces are at least 5 angstroms.

4. The electrolyzer of claim 1 wherein a protective sheet is interposed between the cathode and the catholyte-resistant member on the opposite surface of said iron member from the valve metal member.

5. The electrolyzer of claim 4 wherein the protective sheet is spaced more thna 5 angstroms from said iron plate.

6. The electrolyzer of claim 4 wherein the protective sheet is selected from the group consisting of copper, zinc, cadmium, lead, and molybdenum.

7. The electrolyzer of claim 4 wherein the protective sheet is steel.

8. The electrolyzer of claim 1 wherein a hydrogen barrier metal coating is interposed between the cathode and the catholyte-resistant member on the opposite side of said catholyte-resistant member from the valve metal member.

9. The electrolyzer of claim 8 wherein the hydrogen barrier metal coating is more than 5 microinches thick.

10. The electrolyzer of claim 8 wherein the hydrogen barrier is selected from the group consisting of vanadium, chromium, manganese, cobalt, nickel, copper, zinc, niobium, molybdenum, silver, cadmium, rhodium, tantalum, tungsten, iridium, and gold.

11. The electrolyzer of claim 1 wherein a coating of a material having a higher hydrogen over voltage than the cathode is on the opposite surface of catholyte-resistant member from the valve metal member.

12. The electrolyzer of claim 11 wherein the said coating is more than 5 microinches thick.

13. The electrolyzer of claim 11 wherein the said coating is selected from the group consisting of silver, gold, copper, chromium, manganese, tantalum, cadmium, zirconium, lead, and zinc.

14. The electrolyzer of claim 1 wherein said backplate includes means for removing the molecular hydrogen so formed.

References Cited
UNITED STATES PATENTS

| | | | |
|---|---|---|---|
| 3,337,443 | 8/1967 | Raetzsch et al. | 204—256 |
| 3,441,495 | 4/1969 | Colman | 204—268 |
| 3,563,878 | 2/1971 | Grootheer | 204—256 |

F. C. EDMUNDSON, Primary Examiner

U.S. Cl. X.R.

204—268, 290 R